Figure 1:
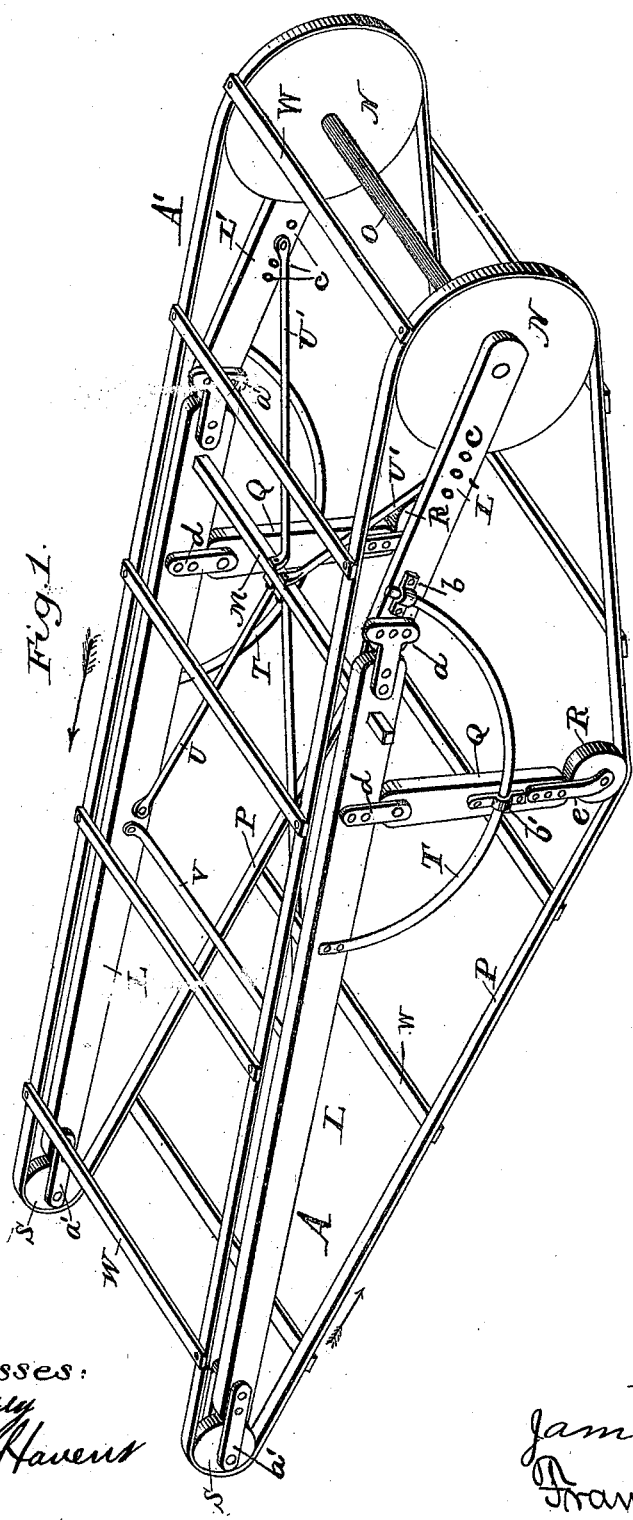

(No Model.) 2 Sheets—Sheet 1.

J. GILES.
REEL FOR HARVESTERS.

No. 357,662. Patented Feb. 15, 1887.

Witnesses:
J. J. Maply
George Havens

Inventor:
James Giles
Frank Sheehy
Attorney

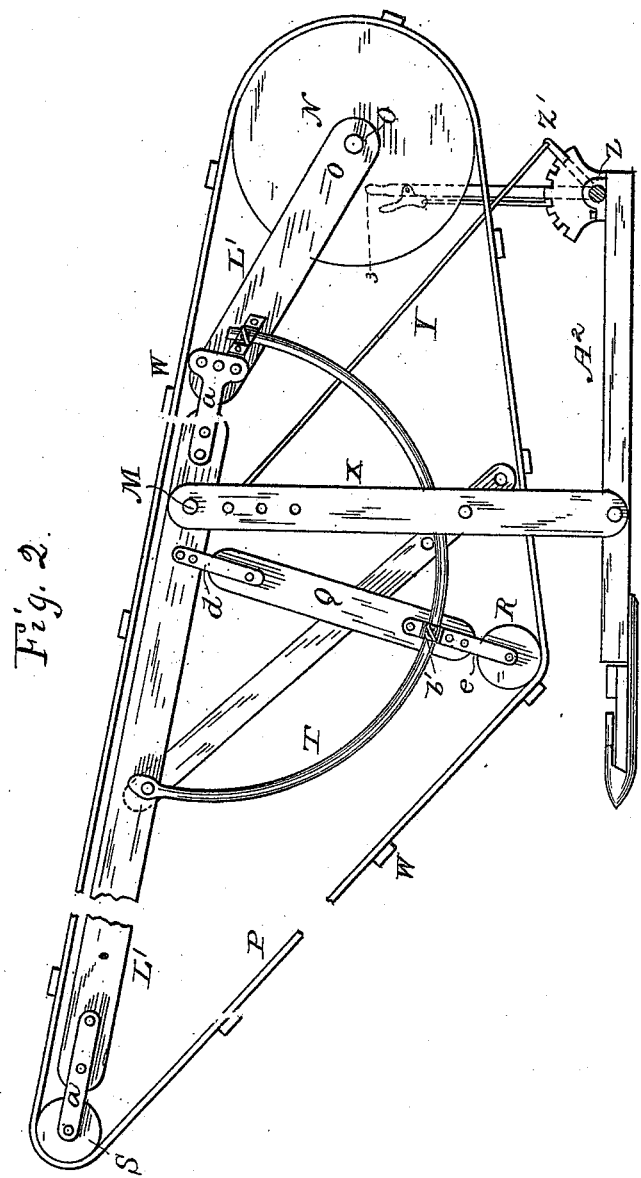

UNITED STATES PATENT OFFICE.

JAMES GILES, OF DISTRICT 49, CHEROKEE COUNTY, ASSIGNOR OF ONE-FOURTH TO FRANCIS ASBURY JACKSON, OF CRESTLINE, KANSAS.

REEL FOR HARVESTERS.

SPECIFICATION forming part of Letters Patent No. 357,662, dated February 15, 1887.

Application filed July 13, 1885. Serial No. 171,556. (No model.)

*To all whom it may concern:*

Be it known that I, JAMES GILES, a citizen of the United States, residing in District 49, in the county of Cherokee and State of Kansas, have invented a new and useful Reel for Grain-Harvesting Machines, of which the following is a specification.

My invention relates to improvements in reels for grain-harvesting machines, especially those machines having binding attachments; and it consists in an adjustable endless slatted-belt reeling device, which will be fully understood from the following description, when taken in connection with the annexed drawings, in which—

Figure 1 is a perspective view of the reel, and Fig. 2 is a side elevation of my improved reel mounted.

Referring to the drawings by letters, A designates a frame composed of two parallel side beams, L L, strengthened by one or more transverse braces, V, and provided with a supporting brace or girt, M, near its rear end, which brace or girt is connected by diagonal braces U to the said beams.

A' designates a rear shorter frame, composed of two parallel bars, L' L', which are pivoted at their front ends to T-shaped straps a a, rigidly secured to the rear ends of the beams L L, and which are adjustable by means of several holes through the said straps. The rear ends of the beams of the adjustable frame A' bear a shaft, O, on which are keyed two large pulleys, N N, over which pass endless belts or chains P, that have transverse slats or beaters W suitably secured to them at proper distances apart to bring continuously two or more slats into operation on the grain at the same time, thereby pressing the grain back against the sickle-bar, holding it there until cut, and then leaving it in proper position to be carried to the binder by the well-known carrying mechanism.

The front ends of the beams of frame A have pulleys S S applied to them by means of strap-extensions a' a', rigidly secured to said beams, over which pulleys the belts P pass. When desired, the rear pivoted frame, A', can be set a little to one side of the vertical plane of the frame A by detaching its ends from the straps a a, and again attaching them on the opposite sides of these straps. In other words, the frame A' is laterally adjustable as well as vertically adjustable bodily, and also adjustable in the arc of a circle. This adjustable frame A' is strengthened by diagonal braces U' U', which are secured to the brace or girt M, and attached to frame A' by bolts passed through any of the holes c.

Q Q designate belt-tighteners, which are pivotally connected to straps d d, secured rigidly to the side beams, L L, near their rear ends, and provided with rollers R on their lower ends, which latter bear on the belts P, as shown in Fig. 1 of the annexed drawings.

T T designate sector-braces, which are rigidly secured at their front ends to the side beams, L, and adjustably connected at their rear ends to the frame A' by suitable clasps, b. These sector-braces T are concentric to the pivotal attachments of the belt-tighteners, and they pass through clasps b', secured thereto. The tighteners can be adjusted so as to tighten the reel-belts and keep the grain in proper position over the sickle-bar while being cut.

The frame A is supported by brace or girt M, and it may be raised or lowered or adjusted forward or backward by the same device used for regulating the position of other reels.

In Fig. 2 I represent a reel-support, which consists of the perforated standard X, pivoted to the frame $A^2$ so that it can be vibrated back and forward. The ends of the brace or girt M are suitably connected to two of such standards X, so that the reel can be adjusted higher or lower bodily.

To the rear part of the frame $A^2$ a shaft, Z, is applied in suitable bearings, having a crank, Z', on each end, which cranks are connected by rods Y to the upper ends of the standards X. By means of a hand-lever, 3, the shaft Z can be oscillated and the reel moved forward or backward, as may be required, whether the machine be working or at rest.

The arrows on Fig. 1 indicate the direction in which the slatted reel is moved, and this motion may be imparted to it from a drive-wheel of a harvester by means of gearing arranged in any suitable manner.

Having described my invention, I claim—

1. A harvester-reel consisting of slatted endless belts or chains passed around pulleys, in combination with the frames A A', bearing said pulleys, and adjustable belt-tighteners, constructed substantially as described.

2. The combination, in a harvester-reel, of the frames A A', braced and adjustably connected together, as described, with belt-tighteners sustained by sector-braces adjustably secured to the rear adjustable frame, A', substantially as described.

3. The combination, with the endless slatted reel and its articulating adjustable frames, of adjustable vibrating standards on the frame A$^2$, the rock-shaft Z, provided with cranks and a hand-lever, and the connecting-rods between the cranks and said standards, substantially as described.

4. The combination of the frames A A', connected together by T-shaped straps and pivots, the braces U U, the transverse shaft M, the braces U' U', adjustably connected to the frame A', the endless slatted reel, its pulleys, the belt-tighteners, and the sector-braces for these tighteners, all constructed and adapted to operate substantially in the manner and for the purposes described.

JAMES GILES.

Witnesses:
J. T. MAXEY,
GEORGE HAVENS.